United States Patent [19]
Sergent

[11] 3,971,403
[45] July 27, 1976

[54] SAFETY VALVE

[76] Inventor: André Sergent, 21, rue Henri Barbusse, Paris 5eme, Seine, France

[22] Filed: Nov. 13, 1974

[21] Appl. No.: 523,551

[30] Foreign Application Priority Data
Nov. 14, 1973 France .................. 73.40530

[52] U.S. Cl. .................. 137/459; 137/463; 137/444; 137/613; 137/614.19
[51] Int. Cl.² .................. F16K 17/04
[58] Field of Search .......... 137/459, 463, 441, 444, 137/613, 614.19; 251/101, 107, 108, 313

[56] References Cited
UNITED STATES PATENTS

| | | | |
|---|---|---|---|
| 443,326 | 12/1890 | Leverich | 251/313 |
| 1,179,462 | 4/1916 | Shaffer | 137/463 |
| 1,207,135 | 12/1916 | Chism | 137/463 |
| 1,311,713 | 7/1919 | Richardson | 137/444 |
| 1,954,927 | 4/1934 | Fuller | 137/459 |
| 2,464,456 | 3/1949 | McGillis et al. | 137/444 |
| 2,847,181 | 8/1958 | Muller | 251/101 |

Primary Examiner—William R. Cline
Assistant Examiner—H. Jay Spiegel
Attorney, Agent, or Firm—Karl W. Flocks

[57] ABSTRACT

A safety valve for fluids, comprising on the upstream side a first valve member openable to a degree dependent on the fluid throughput, and, on the downstream side, a second fully-opening valve member capable of being closed sharply by return mechanism and coupled to the first clack through mechanical linkage uncoupling of which is controlled by the position of the first valve member which depends on a predetermined minimum flow rate, the uncoupling causing return motion and sharp closure of the second valve member. The safety valve is useful in the delivery of a fluid where said delivery must be stopped if the flow rate of fluid falls under a predetermined limit.

4 Claims, 10 Drawing Figures

SAFETY VALVE

The present invention relates to a safety valve for fluids, usable in all cases where it is necessary to cut off a supply sharply when the flow rate drops below a given value, particularly when filling a tank, for example, in order to prevent overflowing.

Specifically in the tank-filling application, a valve according to this invention, associated to a tank inlet valve opening of which is governed by the level in the tank, provides an overflow-preventing system mounted entirely outside the tank. It is thus possible to avoid the constraints which exist in all prior art arrangements employing a link between a supply tank and the receiving tank, such as draw-cables, as well as the problems of standardizing all unions, etc.

The subject valve of this invention further makes it possible not only to eliminate or to very considerably reduce the hammer effect which may occur when valves in a hydraulic circuit are closed, but also to drain the supply conduits after the filling operation with great ease and in complete safety.

A safety valve according to this invention, of the kind having an upstream inner seat and a downstream inner seat, is basically characterized by the fact that it includes, on its upstream side, a first valve member which opens to a degree dependent on the flow rate and, on its downstream side, a second valve member which opens totally and closes suddenly in response to return means and which is coupled to said first valve member through a mechanical linkage uncoupling of which is controlled by the position of the first valve member itself dependent upon a predetermined minimum flow rate and causes retraction and sudden closure of the second valve member, the latter being additionally provided with opening means thereof external to the valve assembly.

In accordance with further characteristics:

the first valve member which bears internally against the upstream seat of the valve (which may be of the axial or swing-valve type), includes means for returning it into its closed position against the pressure resulting from the flow of fluid through the valve;

the second valve member, which bears internally against the downstream seat of the valve is of the balanced or hinged rotary type such as a butterfly-valve, a ball-valve or a cylindrical plug-valve;

in accordance with a first possible embodiment of the invention, the first valve member is of the axial type with a spring urging it towards the upstream seat, and the second valve member is of the swinging type having its actuating shaft extending at right angles to the longitudinal axis of the valve and positioned laterally with respect to the passageway through the valve, the mechanical coupling consisting of a radially extending finger carried by the second valve member and adapted to contact the periphery of the first valve member whereby to cause the second valve member to remain open between a position of predetermined minimum throughput and a position of maximum throughput of the first valve member;

in accordance with a second possible embodiment of the invention, the first valve member is of the axial type with a spring for urging it towards the upstream seat, and the second valve member is of the butterfly type with its actuating shaft extending transversely to the longitudinal axis of the valve, the mechanical coupling including a first finger fast with said first valve member and hingedly connected to a second finger adapted to bear against the second valve member whereby to maintain the same open between positions of predetermined minimum flow rate and maximum flow rate of the first valve member;

preferably, in accordance with said second possible embodiment, the first finger is fixed radially to the first valve member and is fast with a second translatable finger having return spring means on its shaft, which shaft is parallel to the longitudinal axis of the valve, the free end of said second finger co-acting with a cam which is coaxial with the butterfly-valve forming said second valve member;

the cam referred to precedingly is formed with a land, upon which said second finger bears when the butterfly-valve is in its open position;

in accordance with an alternative form of the second embodiment described precedingly, the first valve member is of the swing type and the second valve member is a butterfly valve with a coaxial cam, the mechanical coupling between the two valve members including a link hingedly connected to said first valve member and to a catch cooperating with a notch on said cam;

in the forms of embodiment hereinabove described, the actuating shaft of the second valve member projects externally from the valve and is rigidly connected to an opening lever capable of assuming a closed position through being urged thereinto, a totally open position, and an intermediately open position, the latter position being assured by a second latching lever which bears on the one hand against the valve housing and on the other against a catch carried by said opening lever.

The description which follows with reference to the accompanying non-limitative exemplary drawings will give a clear understanding of how the invention can be carried into practice.

In the drawings.

In the drawings, like parts are designated by like reference numerals.

Figure 1:
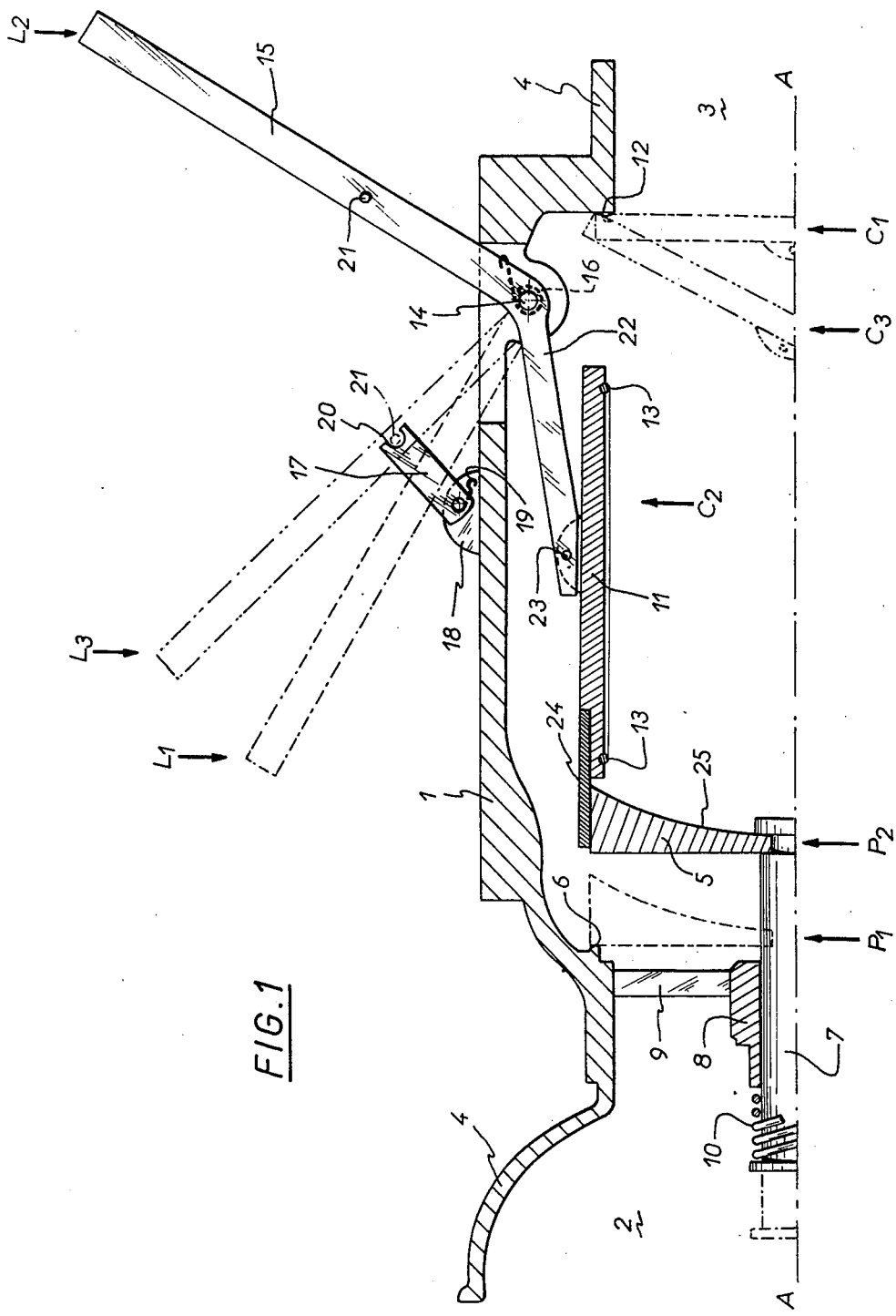
FIG. 1 is a partial sectional portrayal of a first form of embodiment of a valve according to the invention.

Referring first to FIG. 1, a valve according to the invention in its first form of embodiment includes a housing 1 which is symmetrical with respect to the axis A—A, having an upstream or inlet end 2 and a downstream or outlet end 3, each formed with an appropriate flange 4 of any convenient type well-known per se. In its closed position, the first valve member 5 bears against the upstream seat 6 and is of the axial type with a shaft 7 movable through a bearing 8 supported by suitable cross-members 9, and valve member 5 is structurally related to a return spring 10 urging it against its seat 6. The second valve member 11 is of the swinging type and in its closed position bears against the downstream seat 12 and is preferably provided with a suitable seal 13. The actuating shaft 14 of valve member 11 is perpendicular to the longitudinal valve axis A—A and positioned adjacent the periphery of valve housing 1. Shaft 14 protrudes externally and is provided with an opening lever 15 associated to a spring 16 for urging valve member 11 into its closed position. A second lever 17 is hingedly connected to a support 18 fast with housing 1 through the agency of a return spring 19 and is formed at its other end with a groove 20 for cooperating with a peg 21 on lever 15. The purpose and manner of operation of lever 17 will be explained in greater detail hereinafter. Valve member 11 is connected to its shaft 14 through an arm 22 and a hinge 23 and furthermore supports a radially extending finger 24 lying in the plane of valve member 11. Finger 24 is capable of bearing against the peripheral portion of valve member 5, thereby to maintain valve member 11 in its fully open position over and above a predetermined minimum-opening position of valve member 5 set by the withdrawal distance of valve member 5 from its seat 6, said distance depending on the fluid flow rate through the valve.

Preferably, the inner face 25 of first valve member 5, namely the face remote from the face cooperating with seat 6, is so curved concavely that when valve member 11 is opened manually it moves valve member 5 in order to enable finger 24 to engage with valve member 5.

The theory of operation of the valve is as follows, it being assumed that the valve is closed, with valve member 5 bearing on its seat 6 (position P1), valve member 11 bearing on its seat 12 (position C1) of valve member 11 and position L1 of lever 15) and lever 17 disengaged from peg 21. Inlet flange 4 is next connected to a supply of fluid which is then admitted into the valve. The second valve member 11 is then opened (position C2) by means of lever 15 (position L2): responsively to the pressure of the incoming fluid, the flow rate establishes itself by opening valve member 5, which then assumes a position P2 such that finger 24 can bear against its periphery and maintain the second valve member 11 in an open position (C2). When the flow rate diminishes, valve member 5 is urged into its closed position by its spring 10 and moves towards its seat 6 up to a position such that once the flow rate has dropped to a predetermined value, the motion of valve member 5 releases finger 24, whereupon valve member 11, being urged into its closed position by its return spring 16, closes sharply. The flow is then cut off completely, valve member 5 bears on its seat 6, and the valve is closed.

If it is required to empty the supply conduit which had been connected to flange 4, then after said supply has been shut off and a vent provided on the connected conduit, lever 17 is made to engage with peg 21 (position L3 of lever 15), thus causing valve member 11 to open slightly (position C3) and allow a small additional flow to take place.

Figure 2:
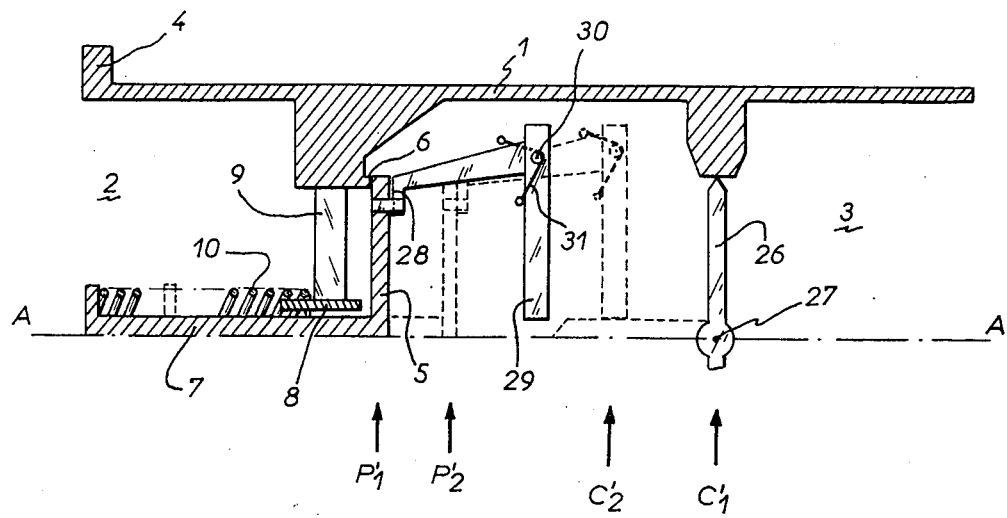
FIG. 2 is a partial sectional portrayal of a second form of embodiment of a valve according to the invention.

Referring next to FIG. 2, a valve according to the invention in its second form of embodiment includes, as described precedingly, symmetrically with respect to axis A—A, a housing 1, an inlet 2, an outlet 3, a first axial valve member 5 bearing on a seat 6, with a shaft 7, support 8 and cross-members 9. The second valve member 26 is of the balanced, so called 'butterfly' type, but could also be of the ball or cylindrical plug type, and actuating shaft 27 of valve member 26 is perpendicular to valve axis A-A and intercepts the same. As in the first form of embodiment described hereinbefore, shaft 27 is connected externally to an opening lever urged into the closed position and to a lever for restraining it in a partly open position, which arrangements are not shown in FIG. 2 for greater clarity.

The mechanical connection between first valve member 5 and second valve member 26 includes a hinged finger with two arms, the end 28 of one of which is fast with valve member 5 and the end 29 of the other of which is capable of bearing against valve member 26 when the same is in its open position. This mechanical linkage is hinged about a pin 30 bearing a return spring 31 for urging the two arms into substantially a mutually perpendicular position.

The theory of operation in this case is as follows, assuming the valve to be closed, valve member 5 bearing on its seat 6 (position P'1) and valve member 26 obturating outlet 3 (position C'1). Having connected the supply conduit to flange 4, valve member 26 is opened (position C'2) by means of the actuating lever (not shown) fast with shaft 27. When as precedingly the fluid flow rate has established itself, valve member 5 opens (position P'2) and its withdrawal enables portion 29 to bear against butterfly valve 26 and to block it in the open position. When the flow rate drops to a predetermined value, valve member 5 moves towards its seat 6, the portion 29 is released from butterfly-valve 26 and the latter is drawn sharply back into the closed position by its return spring (not shown). The same operations for partly opening valve member 26 are then possible by means of the set of levers described precedingly.

Figure 3:
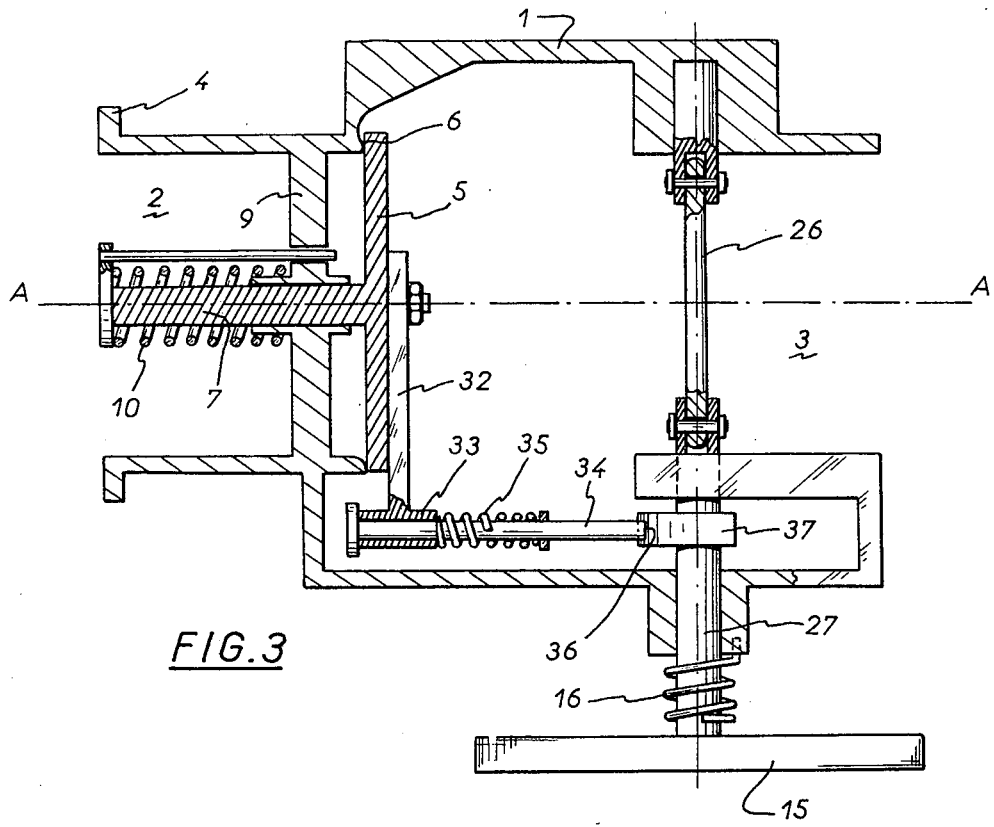
FIG. 3 is a sectional illustration of the second form of embodiment equipped with a cam.

Reference is next had to FIG. 3, in which the member for maintaining the second valve member 26 in the totally open position does not bear directly against the rim thereof, which has the advantage of eliminating any risk of damaging the valve member. A radially extending finger 32 fast with the first valve member 5 is prolonged in the form of a perpendicularly directed bearing 33 through which is slidable a second finger 34. Finger 34 is associated to a return spring 35 which urges its free end 36 into its position farthest from bearing 33. The shaft 27 of butterfly-valve 26 supports a cam 37 positioned away from the internal passageway through the valve and against the camming surface of which the free end 36 of finger 34 is in pressure contact.

Figure 4A:
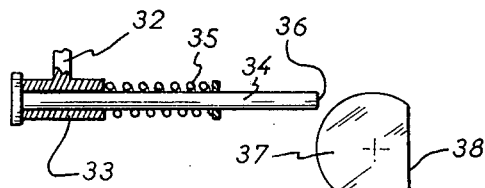
FIGS. 4a, 4b, 4c, 4d are diagrammatic illustrations of the manner of operation of the cam.
Figure 4B:
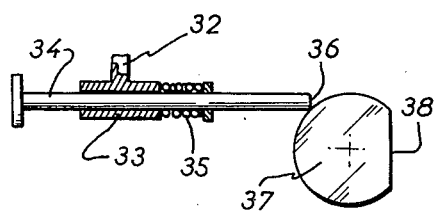
Figure 4C:
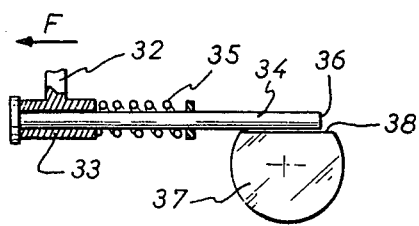

FIGS. 4a through 4c illustrate the relative positions of cam 37 and finger 34 during the different stages of operation, to wit:

FIG. 4a: valve member 5 closed, valve member 26 closed;

FIG. 4b: valve member 5 open, valve member 26 closed;

FIG. 4c: valve member 5 open, valve member 26 open (through the agency of external layer 15).

Cam 37 is formed with a land 38 thereon parallel to the plane of the butterfly-valve and against which finger 34 can enter into pressure contact.

The theory of operation is as follows: with the two valve members closed, land 38 is in the vertical position with the tip 36 in pressure contact with the circular portion of cam 37 responsively to spring 35 (FIG. 4a). When valve member 26 is opened manually, land 38 occupies a horizontal position with the finger bearing thereagainst (FIG. 4c) and maintaining valve member 26 open, and opening of valve member 5 causes finger 34 to translate over land 38. When valve member 5, moving in the direction of arrow F, reaches a position of predetermined minimum opening (dependent on the drop in flow rate), it separates finger 34 from land 38 and the thereby released cam resumes the previous closed position responsively to spring 16. Opening of valve member 5 alone (FIG. 4b) could not cause valve member 26 to open, due to the fact that tip 36 of finger 34 contacts only the circular portion of cam 37.

Figure 4D:
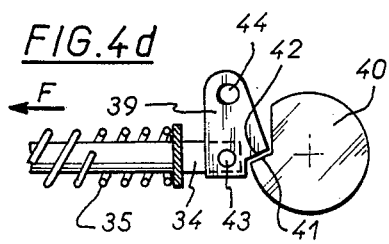

Referring now to FIG. 4d for yet another alternative embodiment, it will be seen that finger 34 does not contact the cam directly but through a catch 39. In this embodiment, the cam 40 fast with valve member 26 is formed with a notch 41 with which can engage a matching portion 42 of said catch, the latter being pivotally supported on finger 34 by a pin 43 fast therewith and being furthermore capable of pivoting about a fixed pin 34. As in the precedingly described embodiment, movement of finger 34 in the direction of arrow F disengages catch 39 from notch 41 and releases the cam 40, thereby closing valve member 26.

Figure 5:
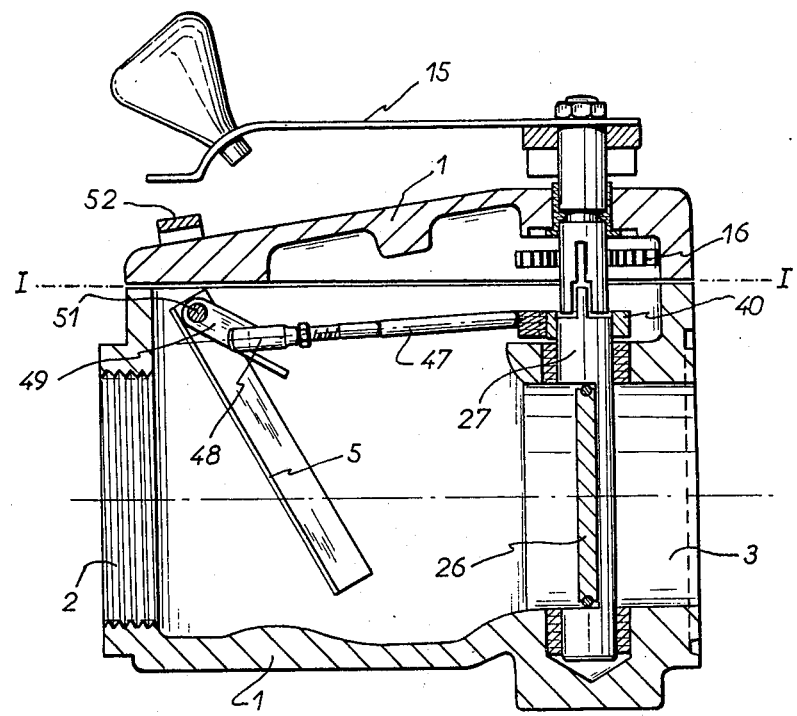
FIGS. 5 and 6 are sectional and top views on the line I-I of an alternative arrangement of the second form of embodiment.
Figure 6:
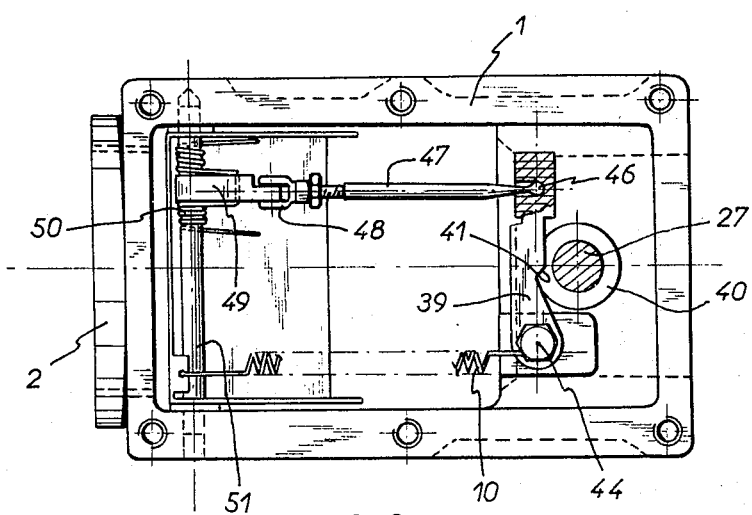

Reference is next had to FIGS. 5 and 6, in which the means for restraining the second valve member 26 in the totally open position include, on the valve member shaft 27, a cam 40 positioned away from the internal passageway through the valve and against which bears a catch 39 engaging in a matching notch 41. Catch 39 is pivotable about a shaft 44 and its end remote therefrom is formed with a seat for receiving the ballend 46 of a rod 47 interconnecting the first swing-valve member 5 and the second valve member 26. The end of rod 47 remote from ball 46 bears a clevis 48 hingedly connected to a lever 49 for actuating valve member 5 with which it is linked through a spring 50. Lever 49 is supported on the same shaft 51 as swing-valve member 5, and adjacent thereto is secured one end of return spring 10 of valve member 5, the other end of spring 10 being fastened to a fixed point on the valve housing. An actuating lever 15 is fast with the externally projecting portion of second-valve member shaft 27, the free end of said lever being engagable into a suitable latching notch 52.

As in the previously described embodiments, when valve member 26 is open, catch 39 locks the cam 40, the valve member 5 being kept open by the flowing fluid. When valve member 5 closes due to a predetermined drop in the flow rate, rod 47 operates through ball-end 46 to cause catch 39 to pivot on its shaft 44, thereby releasing cam 40, whereupon valve member 26 suddenly closes responsively to return spiral spring 16.

A valve according to this invention accordingly provides a simple and effective way of suddenly cutting off a flow of fluid when the flow rate drops to a predetermined or insufficient minimum value, and can be used with advantage in cases involving the supply of a gaseous fuel to a gas burner. For as is well-known, a gas burner may be extinguished if the flow of gas to it becomes insufficient, thus allowing the gas to escape at the same low but steady rate into nonventilated premises, and may fail to relight when the normal gas flow is restored, resulting in a danger of fire and/or asphyxiation.

Another application for the subject valve of this invention, which falls within the scope thereof, consists in utilizing it in apparatus for filling a tank and preventing overflow therefrom.

Figure 7:
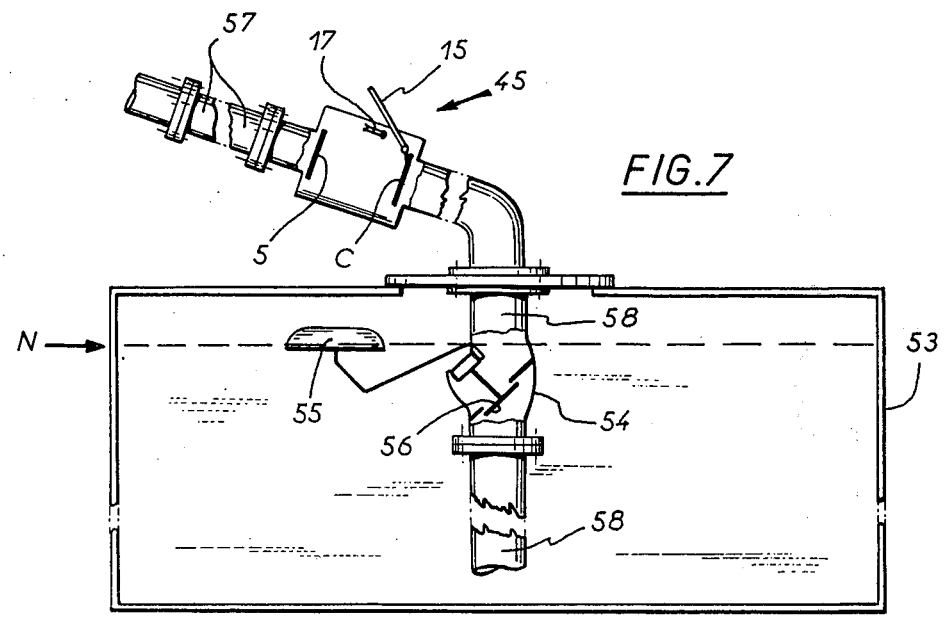
FIG. 7 is a diagrammatic portrayal of a system for filling a tank without overflow, comprising a valve according to the invention.

Reference is accordingly had to FIG. 7, in which a tank 53 is to be filled up to a set level N. In the manner well-known per se, tank 53 is equipped with a valve 54, opening of which may be controlled for example by a float 55 which upon reaching the level N closes the valve. Valve member 56 of valve 54 is preferably of the balanced type, as this enables a float of small size to be used. The connection between the supply source (a road tanker for example) and the tank may be provided through a hose 57. Valve 54 is connected into the internal tank piping 58, while safety valve 45 is positioned on the external piping in proximity to the filling hole.

The theory of operation in this application is as follows: having connected the hose 57 between the tanker and the tank 53 to be filled, the road tanker's delivery valve is opened. So long as the tank is not full or about to become so, valve member 56 remains open. When valve member C of valve 45 is opened by means of lever 15, delivery begins. The first valve member 5 of valve 45 opens sufficiently to ensure that valve member C is kept open. As the level rises in the tank up to a given limit (dependent on the position of float 55 and the adjustment of valve member 56), it causes float 55 to rise and to gradually close valve member 56. The flow rate diminishes and valve member 5 of valve 45 approaches its seat. When the flow rate has diminished sufficiently, valve member 5 suddenly releases valve member C, which then closes completely. Delivery ceases immediately and overflowing is entirely avoided. In order to empty the hose 57 and the piping between valves 54 and 45, the operator can then move lever 15 into a slightly open position (L3 in FIG. 1) by means of lever 17. He then closes the road tanker's valve and disconnects the hose from the tanker, thereby allowing the air required to drain the piping to enter. Since valve member 56 is not then completely closed, it enables the contents of the supply piping to pour into the tank.

It goes without saying that changes and substitutions of parts may be made in the forms of embodiment described hereinabove without departing from the scope of the invention as set forth in the appended claims.

I claim:

1. In a safety valve-body for fluids, provided internally with an upstream seat and a downstream seat and comprising on the upstream side a first valve member openable to a degree dependent on the fluid flow rate, bearing internally upon said upstream seat and on the downstream side a second fully opening valve member including a shaft portion carrying thereon return means for sharply closing said second valve member, and mechanical linkage means coupling said second valve member to said first valve member, said first valve member being constituted by a swing-valve including means for urging it into closed position against the direction of the fluid flowing through the valve, said second valve member being constituted by a butterfly-valve having a shaft with one end projecting externally through said valve-body, said mechanical linkage means including a lever and a spring linking said lever to said first valve member, and a rod with a clevis fitted on one end thereof, said lever being in articulating relationship on said clevis, the second end of said rod comprising a ball engaged in a catch having an axle parallel to the shaft of said second valve member and provided with a matching portion in engagement with a cam fitted on said shaft, a latching means for opening of said second valve member comprising a lever fitted on the end of said shaft projecting externally, the free end of said lever being engageable in a latching notch on said body, whereby a predetermined position of said first valve member allows said mechanical linkage to cause disengagement of said catch from said cam and the sharp closure of aid second valve member.

2. A safety valve according to claim 1, in which the means for controlling opening of the second valve member are fixed to an extension of the shaft of said second valve member externally of the valve and are formed by a lever adapted to assume a retracted closing position, a fully-opening position and an intermediate-opening position, means in the form of a second lever of the latching type fast with said externally projecting shaft having one end thereof coacting with a peg carried by said lever and the other end thereof for reaction against the housing of said valve and a latching notch on said valve into which said second lever may engage.

3. A safety valve according to claim 1, in which said spring urges said first valve member towards the upstream seat and the second valve member which is of the butterfly type has its actuating shaft extending perpendicularly to the longitudinal axis of the valve and positioned to the side of the passageway through the valve, the coupling means of said mechanical linkage comprising a rod member having its ends hingedly connected respectively to said first valve member and to the free end of a hingedly supported catch member, cam means having an axis parallel to that of said second valve member wherein when said second valve member is in its open position cooperates with a notch formed on the camming surface of said cam means to hold said open position.

4. A safety valve according to claim 1, wherein the upstream side is connected to a supply source and the downstream side is connected to a tank to be filled up to a set level and provided with an internal valve, whereby as the level rises in said tank up to the given limit said internal valve closes gradually and said safety valve closes completely, thus avoiding any over flowing from said tank.

* * * * *